United States Patent
Larin et al.

(10) Patent No.: US 10,061,571 B2
(45) Date of Patent: Aug. 28, 2018

(54) SYSTEM AND METHOD FOR LINK TIME OPTIMIZATION

(71) Applicant: Qualcomm Innovation Center, Inc., San Diego, CA (US)

(72) Inventors: Sergei Larin, Austin, TX (US); Shankar Kalpathi Easwaran, Austin, TX (US); Hemant Kulkarni, Cedar Park, TX (US)

(73) Assignee: QUALCOMM Innovation Center, Inc., San Diego, CA (US)

( * ) Notice: Subject to any disclaimer, the term of this patent is extended or adjusted under 35 U.S.C. 154(b) by 22 days.

(21) Appl. No.: 15/273,511

(22) Filed: Sep. 22, 2016

(65) Prior Publication Data
US 2017/0139694 A1    May 18, 2017

Related U.S. Application Data

(60) Provisional application No. 62/256,096, filed on Nov. 16, 2015.

(51) Int. Cl.
*G06F 8/41* (2018.01)
*G06F 8/54* (2018.01)
*G06F 9/445* (2018.01)

(52) U.S. Cl.
CPC .............. *G06F 8/4441* (2013.01); *G06F 8/41* (2013.01); *G06F 8/443* (2013.01); *G06F 8/54* (2013.01);
(Continued)

(58) Field of Classification Search
CPC .......... G06F 8/41–8/54; G06F 9/44521; G06F 17/2705; G06F 17/271
(Continued)

(56) References Cited

U.S. PATENT DOCUMENTS 5,297,291 A * 3/1994 Murphy .............. G06F 9/44521
719/331
6,182,283 B1 * 1/2001 Thomson ................ G06F 9/449
717/153
(Continued)

OTHER PUBLICATIONS

Levine, J. R., Linkers & Loaders, Morgan Kaufmann, 1999, pp. 136-138 and 273-291, [retrieved on Dec. 6, 2017], Retrieved from the Internet: <URL:https://pdfs.semanticscholar.org/6a01/2a232faa0b885e8c45a1775d16ddc02b5680.pdf>.*
(Continued)

*Primary Examiner* — Geoffrey St Leger
(74) *Attorney, Agent, or Firm* — Neugeboren O'Dowd PC (57) ABSTRACT

A method for link time optimization comprises parsing, by a compiler, an intermediate representation file to determine what symbols are present in the intermediate representation file. The method comprises providing the symbols to a linker and creating, by the linker, a symbol use tree of all the symbols that are present in the intermediate representation file and other symbols in binary code received by the linker. The method further comprises discarding, by the linker, any received objects for which no use can be identified and all dependencies of the objects. The method includes providing, from the linker to the compiler, a preserve list of symbols, the preserve list comprising a list of symbols proven used by the objects and the intermediate representation files. The method comprises compiling the intermediate representation files and the objects based on the preserve list of symbols, and deleting, by the linker, any remaining unused objects.

18 Claims, 6 Drawing Sheets

(52) U.S. Cl.
CPC .......... *G06F 9/44521* (2013.01); *G06F 8/427* (2013.01)

(58) Field of Classification Search
USPC ................................................ 717/140–167
See application file for complete search history.

(56) References Cited

U.S. PATENT DOCUMENTS

| | | | | |
|---|---|---|---|---|
| 6,247,175 | B1* | 6/2001 | Ledford | G06F 8/4435 |
| | | | | 717/107 |
| 6,434,742 | B1* | 8/2002 | Koepele, Jr. | G06F 8/54 |
| | | | | 717/140 |
| 6,804,682 | B1* | 10/2004 | Kemper | G06F 8/72 |
| 7,080,370 | B1* | 7/2006 | Crowl | G06F 8/41 |
| | | | | 717/163 |
| 7,356,813 | B2* | 4/2008 | Liu | G06F 8/433 |
| | | | | 717/154 |
| 9,558,096 | B2* | 1/2017 | Huang | G06F 11/3409 |
| 2004/0064809 | A1* | 4/2004 | Liu | G06F 8/433 |
| | | | | 717/158 |
| 2012/0222010 | A1* | 8/2012 | Wu | G06F 9/44521 |
| | | | | 717/124 |
| 2014/0026127 | A1* | 1/2014 | McEwan | G06F 8/37 |
| | | | | 717/146 |
| 2015/0269052 | A1* | 9/2015 | Huang | G06F 11/3409 |
| | | | | 717/140 |

OTHER PUBLICATIONS

Emprog ThunderBench Linker Script Guide Version 1.2, Emprog, May 2013, 45 pages, [retrieved on Dec. 6, 2017], Retrieved from the Internet: <URL:http://www.emprog.com/support/documentation/thunderbench-Linker-Script-guide.pdf>.*

De Bus, B., et al., Link-Time Optimization of ARM Binaries, Proceedings of the 2004 ACM SIGPLAN/SIGBED conference on Languages, compilers, and tools for embedded systems, 2004, pp. 211-220, [retrieved on Jun. 13, 2018], Retrieved from the Internet: <URL:http://dl.acm.org/>.*

Fernández, M., Simple and effective link-time optimization of Modula-3 programs, Proceedings of the ACM SIGPLAN 1995 conference on Programming language design and implementation, 1995, pp. 103-115, [retrieved on Jun. 13, 2018], Retrieved from the Internet: <URL:http://dl.acm.org/>.*

* cited by examiner

SYSTEM AND METHOD FOR LINK TIME OPTIMIZATION

PRIORITY

This application claims priority to U.S. Provisional Application No. 62/256,096, filed Nov. 16, 2015, and entitled SYSTEM AND METHOD FOR LINK TIME OPTIMIZATION, which is incorporated herein by reference.

FIELD

The present invention relates generally to compilers that compile high-level code to machine code and more specifically to link time optimization.

BACKGROUND

In general, when a high-level language such as C or C++ is compiled to executable machine code, a translation occurs from a human readable source code language (e.g., C or C++) into a processor executable machine language, which includes a set of machine instructions that are executable by a processor.

Most compilation processes, or "flows," involve the linking of compiled code by software known as a linker. This linking is necessary because many computer programs are developed in such a way that they are comprised of multiple source files or libraries, but compilation is typically accomplished one file at a time. Linking is the process of joining all the compiled files into a single executable. In general, code optimization is the process of making code faster to execute and less demanding on limited resources like memory and processing power. Various compilation techniques optimize code at some point during the compilation process, or prepare it for optimization at run-time. Typically, the "scope," or extent of an optimization is a single file or library (a library being a collection of related files). One of the points in the process that optimization can take place is at link time, which occurs before run time.

Link time optimization (LTO) is a powerful compilation technique that allows the broadening of the optimization scope in programming languages that otherwise compile a program one file at a time. One of the responsibilities of a linker is to resolve symbols across a compiled file. In LTO, the linker can resolve symbols not only across one file, but across multiple files that are to be linked in the final executable, which thereby allows the optimization scope to include multiple files.

A linker script is another utility used in conjunction with a linker, often in embedded application environments. It is used to express a fine degree of control over the final executable image—and namely, the particular sections thereof—produced during the compilation (and optimization) process. Often, though, if a user tries to use a linker script in an LTO environment, the linker utilized in LTO and the linker script itself come into conflict. During an LTO build process, the linker is responsible for informing a compiler about external dependencies between various files and libraries and any other users of LTO resident objects, in order to resolve symbols across the entire scope. The process of informing a compiler of external dependencies can become especially complex and difficult when a linker script is involved in the LTO process. If the linker does not inform the compiler of these dependencies, no proper code generation is possible. Current implementations of this process are conservative in nature, and not highly optimized.

SUMMARY

An aspect of the present disclosure provides a method for link time optimization comprising parsing, by a compiler, an intermediate representation file to determine what symbols are present in the intermediate representation file. The method may then comprise providing the symbols to a linker and creating, by the linker, a symbol use tree of all the symbols that are present in the intermediate representation file and other symbols in binary code received by the linker. The method further comprises discarding, by the linker, any received objects for which no use can be identified and all dependencies of the objects. Then, the method includes providing, from the linker to the compiler, a preserve list of symbols, the preserve list comprising a list of symbols proven used by the objects and the intermediate representation files. The method also comprises compiling the intermediate representation files and the objects based on the preserve list of symbols, and deleting, by the linker, any remaining unused objects.

Another aspect of the disclosure provides a computing device comprising a processor and a memory, the processor and memory together implementing a linker and a compiler that are configured to perform a method for link-time optimization, the method comprising parsing, by a compiler, an intermediate representation file to determine what symbols are present in the intermediate representation file. The method may then comprise providing the symbols to a linker and creating, by the linker, a symbol use tree of all the symbols that are present in the intermediate representation file and other symbols in binary code received by the linker. The method further comprises discarding, by the linker, any received objects for which no use can be identified and all dependencies of the objects. Then, the method includes providing, from the linker to the compiler, a preserve list of symbols, the preserve list comprising a list of symbols proven used by the objects and the intermediate representation files. The method also comprises compiling the intermediate representation files and the objects based on the preserve list of symbols, and deleting, by the linker, any remaining unused objects.

Yet another aspect of the disclosure provides a non-transitory, tangible computer readable storage medium, encoded with processor readable instructions to perform a method for link-time optimization, the method comprising parsing, by a compiler, an intermediate representation file to determine what symbols are present in the intermediate representation file. The method may then comprise providing the symbols to a linker and creating, by the linker, a symbol use tree of all the symbols that are present in the intermediate representation file and other symbols in binary code received by the linker. The method further comprises discarding, by the linker, any received objects for which no use can be identified and all dependencies of the objects. Then, the method includes providing, from the linker to the compiler, a preserve list of symbols, the preserve list comprising a list of symbols proven used by the objects and the intermediate representation files. The method also comprises compiling the intermediate representation files and the objects based on the preserve list of symbols, and deleting, by the linker, any remaining unused objects.

DETAILED DESCRIPTION

Figure 1:
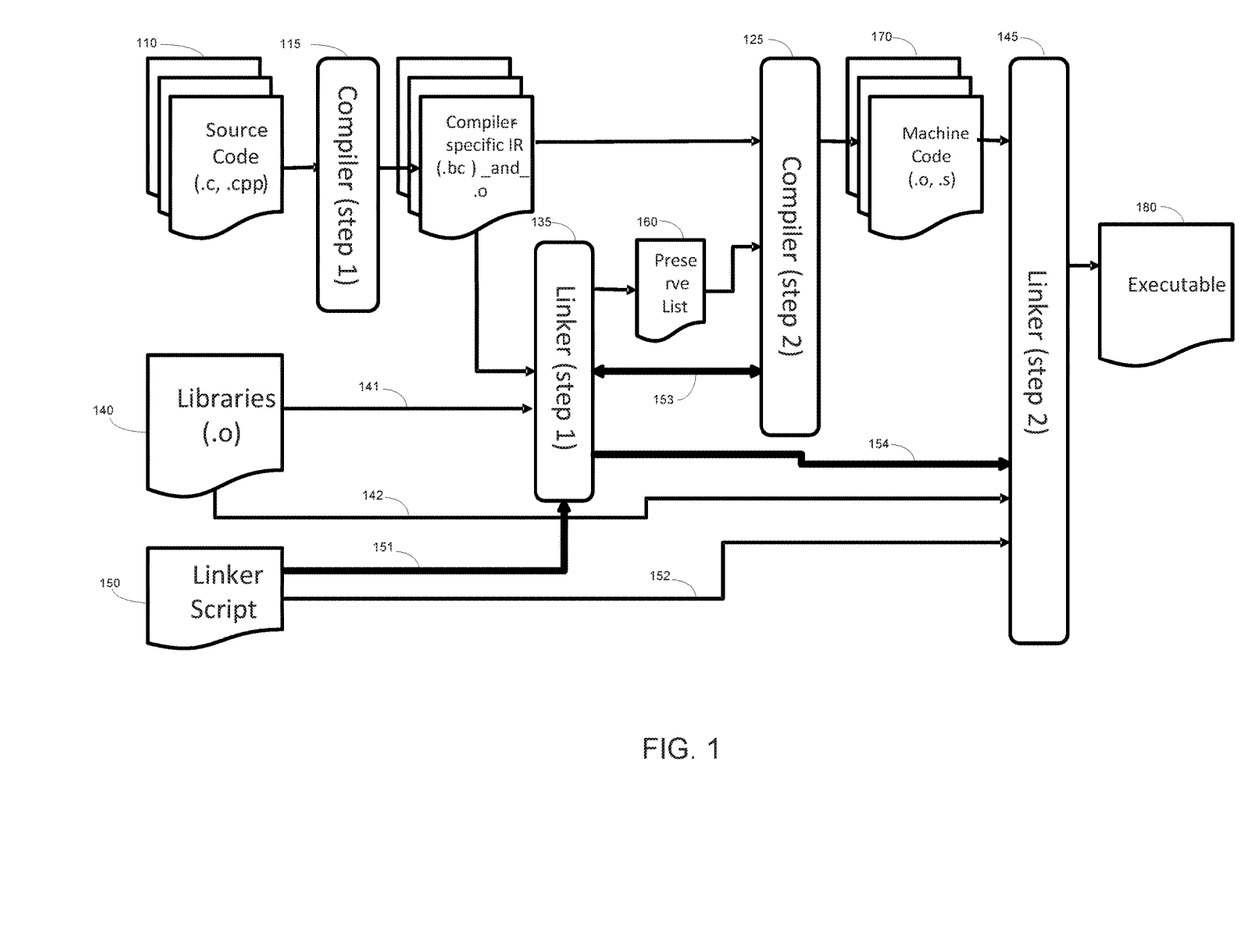
FIG. 1 shows a logical block diagram of a Link Time Optimization (LTO) compilation flow in the presence of a linker script according to an embodiment of the disclosure.

Referring first to FIG. 1, shown is block diagram depicting several aspects of an exemplary embodiment. The diagram depicts a process 100 of compiling and linking received source code to an executable in a flow that utilizes LTO in conjunction with a linker script. As previously mentioned, LTO is a highly desirable optimization methodology because it is powerful and works well in very demanding general purpose development environments. In embedded development environments (such as in smartphones), though, LTO is often not used, due to conflicts that exist between LTO and another development technique known as a customized linker script, which is used in order to allow a developer to exert a fine degree of control over an executable in the embedded environment. The process 100, in many embodiments, implements features and functions of a LTO process as described in co-owned and co-pending application Ser. No. 15/273,527, entitled "Link Time Optimization in the Presence of a Linker Script," which is incorporated by reference herein in its entirety. Aspects of the present disclosure depend on systems and methods of communication between the linker and compiler in an LTO flow when a linker script is also used to exert a fine degree of control over the final executable. Throughout the disclosure, the terms "LTO process," "LTO approaches," "LTO flow," "LTO compilation flow" and "LTO tool flow" may be used interchangeably to refer to a compilation and optimization scheme in which Link Time Optimization is used. Prior LTO approaches were designed for optimization in a general purpose environment, such as on a PC, and are quite effective at optimization in such environments. Linkers in these LTO processes typically have a default settings for determining the layout and other attributes of a final executable image. In some cases, these linkers can be said to have a "default linker script," but in many cases, there is not a separate "script" outside of the linker that defines the default layout of the executable. In embedded development environments, embedded application developers often wish to exert a finer degree of control of the layout of an executable that would override the default settings in a given linker. For example, in a non-LTO process of compilation and linking, a developer could write a customized linker script that instructs the linker to organize the executable code by moving sections in a particular manner. Such control of code layout is highly desirable in embedded environments, such as those for smartphone devices, where processing and memory resources are highly constrained, but highly predictable in their properties. Throughout this disclosure, references to the term "linker script" should be construed to mean customized linker scripts that are written to override default linker settings unless otherwise specified.

Because traditional LTO flows have been designed for general purpose environments that don't require the use of a linker script, linker scripts are often incompatible with LTO environments. However, it would be beneficial to use the powerful optimization aspects of traditional LTO flows in conjunction with linker scripts in embedded environments. In order to make linker scripts functional in LTO flows, additional communication needs to take place between various components of an LTO process. In particular, a linker script needs to be able to communicate to a linker, and a linker and a compiler need to be able to communicate in a way that was not possible in earlier approaches. Application Ser. No. 15/273,527 describes implementations of these communication interfaces between the linker script and the linker, and between the linker and compiler, in great detail. The present disclosure discusses in detail how an aspect of this communication—namely, the preserve list—may itself be further optimized, or improved, in an LTO flow in the presence of a linker script.

FIG. 1 is a logical diagram and should not be construed to be a hardware diagram. The blocks in FIG. 1 may be implemented by software alone, hardware alone, firmware, or a combination of hardware and software. The process outlined in FIG. 1 may be implemented by a compiler and a linker that interact with each other and with versions of code at particular steps in the process. The compiler is generally a single software program and a linker is also generally a single software program, but each are depicted visually in the figures as being broken up into steps in order to show inputs, outputs, and the timing of communication between each of the programs. For ease of reference, the compiler is depicted as interacting at Compiler (step 1) 115 and Compiler (step 2) 125 with Linker (step 1) 135 and Linker (step 2) 145. Throughout the disclosure, the compiler may be referred to interchangeably at its first and second steps as "first/second step of the compiler," "first/second stage of the compiler," "the compiler at step one/two," or "the compiler at stage one/two." The linker may be referred to with similar terminology and reference to the first or second steps or stages.

Figure 2:
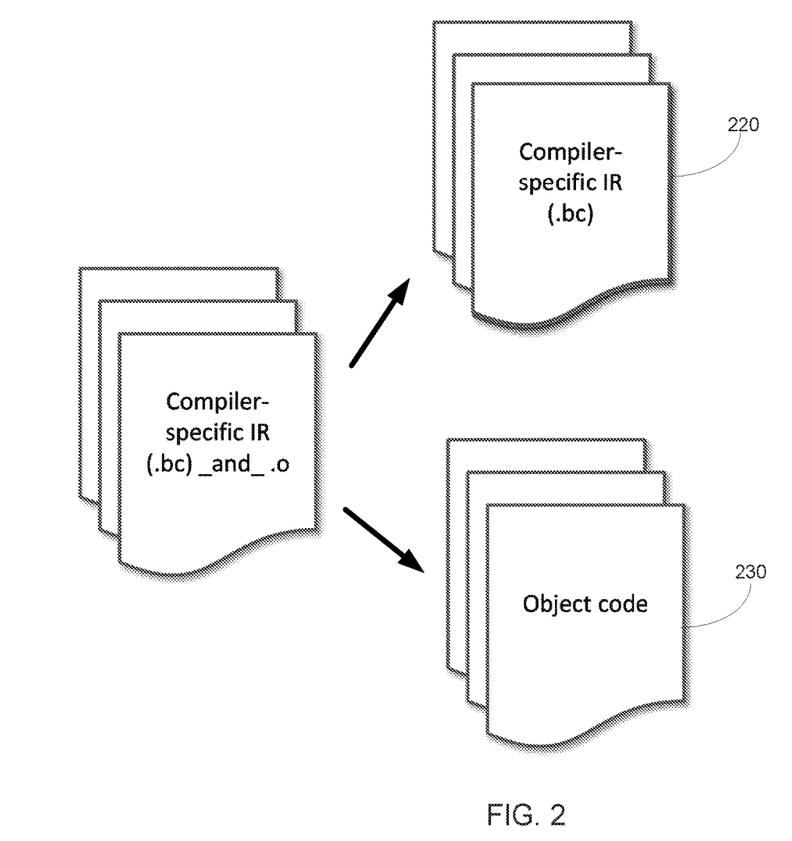
FIG. 2 shows two kinds of code that can be produced in a first step of a compiler in an LTO process.

Compiler (step 1) 115 first receives source code 110 of a program. As shown, the source code 110 has example file extensions .c and .cpp, (indicating source code written in C or C++, respectively), but source code may be received in other languages, or may be in a human-readable assembly language. Compiler (step 1) 115 then compiles the source code 110 into two types of files, the first of which are compiler-specific intermediate representations (IR, also referred to as internal representation), designated with a .bc (bit code) file extension, and the second of which are object code (designated with a .o file extension). The determination of whether a portion of the source code 110 is compiled into IR or object code is made by a makefile of the source code (written by a programmer or "user"). Compiler (step 1) 115 performs optimizations that are possible at the level of local scope (i.e., one file or one library) and do not yet require information about the global scope (i.e., a whole program). Most optimizations may be performed later, at Compiler (step 2) 125. FIG. 2 shows how these two types of files compiled at Compiler (step 1) 115 are distinct, and turning now to a discussion of their differences will facilitate an understanding of the present disclosure. While discussing the subsequent figures, reference may still be made to the components in FIG. 1.

As mentioned, and as shown in FIG. 2, Compiler (step 1) 115 generates compiler-specific IR code 220 and object code 230. Compiler IR code generation includes platform-specific section name generation for each function and object that will be optimized at link time. The IR code 220 is often considered "half-baked," or, in other words, incompletely optimized. Though it contains some optimizations that are useful to the compiler, IR code is typically not readable by the linker (or by the processor, for that matter) until it is further compiled to machine code. It is called "compiler-specific" because it is in a form that is readable only to the particular compiler. Compiler (step 1) 115 does also produce some object code 230, which is readable by the linker and ready to be linked—no further optimization to the object code 230 is required for linking.

Turning back to FIG. 1, existing libraries 140 are shown as additional inputs to the linker 135, 145 at steps 141 and 142, respectively. These libraries may, for example, may be providing standard C functionality in the embedded environment, or may be libraries from an external project. For example, the libraries 140 may include firmware code that is presented to the linker 135, 145 as a library, without additional source code added to it. The existing library 140 files are designated as .o, because they are present in object format with all the information needed for linking already present in some form.

FIG. 1 also shows a linker script 150 in communication with the linker 135, 145 at interfaces 151 and 152, respectively. As previously discussed, in prior approaches, linker script has been virtually incompatible with LTO flows, and typically, any kind of linker script control, if utilized at all, would have been exerted only at the end of the process (i.e., through step 152, wherein the linker script could be input into the linker at the last linking step). However, FIG. 1 shows an implementation of an LTO tool flow with support for a linker script 150 as described in co-owned and co-pending application Ser. No. 15/273,527. The steps that facilitate the linker script support are depicted as interfaces 151, 153, and 154, each of which are highlighted in bold lines. Each of these steps represent one or more interfaces, communication channels, and/or instructions that allow the linker script to interact with the LTO tool flow in ways that were not previously available. In particular, the linker script 150 may interact with Linker (step 1) 135 through interface 151, Linker (step 1) 153 may communicate with Compiler (step 2) 125 through interface 153, and Linker (step 1) 135 may communicate with Linker (step 2) 145 through interface 154. Linker (step 1) 135 provides a "preserve list" 160 to Compiler (step 2) 125, which will be described in further detail later in this disclosure. The final steps in the LTO flow 100 depicted are that Compiler (step 2) 125 compiles all the IR and object files into machine code 170, and Linker (step 2) 145 links compiled code from multiple scopes to a final executable 180.

Each object file, whether it comes from source code that has been compiled in Compiler (step 1) 125, or from existing object libraries 140, includes global, local and common symbols that represent named areas of memory or code. The term "symbols" is a blanket term that encompasses both functions (i.e., a sequence of instructions in code that executes) and objects (i.e., a declared variable). After Compiler (step 1) 125, the rest of the compilation process is strongly dependent on what symbols are used and where they are used. In particular, dependencies of the symbols on each other determine where a particular function or object will be placed in an output section of the executable. A problem that exists at this step is that Linker (step 1) 135 cannot parse (or read) the compiler-specific IR to be able to tell what symbols those particular IR files include and how they are used or referenced.

Part of the process of compilation is to remove redundancies in code. Both compilers and linkers, by themselves, can remove redundancies. A compiler, in general, can remove redundancies in a number of ways. A linker can typically also remove redundancies in code, but compilers are generally more efficient and nimble in doing so because they have a better understanding of the code. A compiler performs the bulk of the work of identifying redundancies, and then informs the linker of these redundancies, which allows the linker to perform a process known as garbage collection. The compiler itself performs a similar, though not identical function to the linker's "garbage collection," which is known on the compiler side as "optimizing out" redundant code. Optimizing out is essentially the deletion of code that has been identified as redundant by the compiler. In other words, the compiler identifies the "garbage" by optimizing it out and the linker "collects" it during the linker process known as garbage collection. The ability to eliminate redundant code is one of the main benefits of the compilation process because it reduces the amount of unnecessary code in the executable, making the final executable shorter and faster to execute. However, neither the linker nor the compiler should eliminate code at any point in the compilation process that will ultimately be needed in the final executable, and therefore, if neither the compiler nor the linker know whether a particular object will be needed, that code will be preserved and not eliminated.

As previously discussed, Linker (step 1) 135 cannot read compiler-specific IR, and therefore cannot tell which symbols exist within it. In addition, the compiler itself does not ordinarily track symbols within individual files that it is compiling for the purpose of assigning code to particular sections of the output file. After Linker (step 1) 135, IR files will still be further compiled (at Compiler (step 2) 125) into machine code, which means that some objects have yet to be created, changed, or deleted at the time of Compiler (step 1) 115 and Linker (step 1) 135. Since objects have yet to be created, changed, or deleted, the symbols that are defined and/or used within the IR are not all yet known at this step. Because the symbols contained in the IR files are unknown at this time, garbage collection related to IR files is highly conservative. That is, very few, if any IR symbols are discarded if it is not known what symbols are contained in them. As a result, very little optimization is performed on IR files by the compiler.

Because the symbols within IR themselves are unknown, the "definition-use" relationship (commonly known as "def-use" relationship) between symbols is also unknown. Source code generally determines "definitions" and "uses" of variables. There are certain portions of code that contain definitions without uses. Such a portion of code is valid, but it is suboptimal; that is, that portion may be unnecessary and is a candidate to be eliminated during optimization. There are other portions of code that contain both a definition (e.g., of a symbol) as well as use of that same symbol. Any code that contains a use cannot be eliminated, because it will, of course, be actually used in the execution of the code. Therefore, code containing both a definition and a use of a symbol will be kept, and its use is enabled by the fact that it is defined. However, there are portions of code that contain uses of variables but that do not have a definition of those variables within the same function or object; such a portion of code would only be valid if the definition of the use were contained elsewhere in the code. That is, code that contains a use without a definition is invalid. It is possible for IR files to use symbols that are defined within the files of the object scope, and vice versa. It is even possible for the linker script itself to use symbols in the object scope, or define variables to be used in the final image or for its post compilation processing. Therefore, it is imperative that the linker knows not only what symbols are ultimately used in an entire compilation scope, but also that it knows not to eliminate any definitions for symbols that have uses.

An additional challenge to optimization is presented in an LTO flow because it is the responsibility of Linker (step 1) to not only look at the files in the current scope, but to also look at the files outside that scope to determine what symbols are used in other scopes (to ultimately create the final executable). In existing compilation processes, and in the current implementation, Linker (step 1) creates a list of these knowable symbols, which is known as a preserve list 160, and passes it on to Compiler (step 2) 125. This list informs Compiler (step 2) 125 which symbols can be discarded, and consequently, which code can be deleted. In this particular implementation, where a linker script is present, the linker script also communicates with Linker (step 1) 135. In some implementations, a linker script can also expressly influence the linker 135 regarding what symbols to include on the preserve list 160. For example, a linker script can define a use of a symbol that does not exist either in the linker space or compiler space. If a marker is introduced by a linker script, the compiler or linker may not otherwise see a use of the symbol, but because of the linker script, the linker has to respect the instruction and keep the symbol on the preserve list. Such an instruction by a linker script is not required in order to implement the disclosure, however. Both the content of the IR and the linker script are highly influential on the preserve list 160. The IR is treated conservatively due to the fact that the linker cannot read IR and therefore cannot tell what definitions and uses of symbols exist in IR files, and as a result, very few symbols are left off of the preserve list 160 in case an IR file might need them. Additionally, the linker script 150, with its high degree of control and particularity may likely contribute to a "pessimistic" view of the code that results in preserving an excessive amount of symbols. As a result of the conservative symbol preservation related to IR files, and the influence of the linker script 150, the preserve list 160 might often contain too many symbols that are ultimately not needed. The present disclosure provides ways to produce an optimal preserve list, which preserves the fewer symbols that are actually needed, allowing for code that is not needed to be discarded more efficiently during the compilation process.

Figure 3:
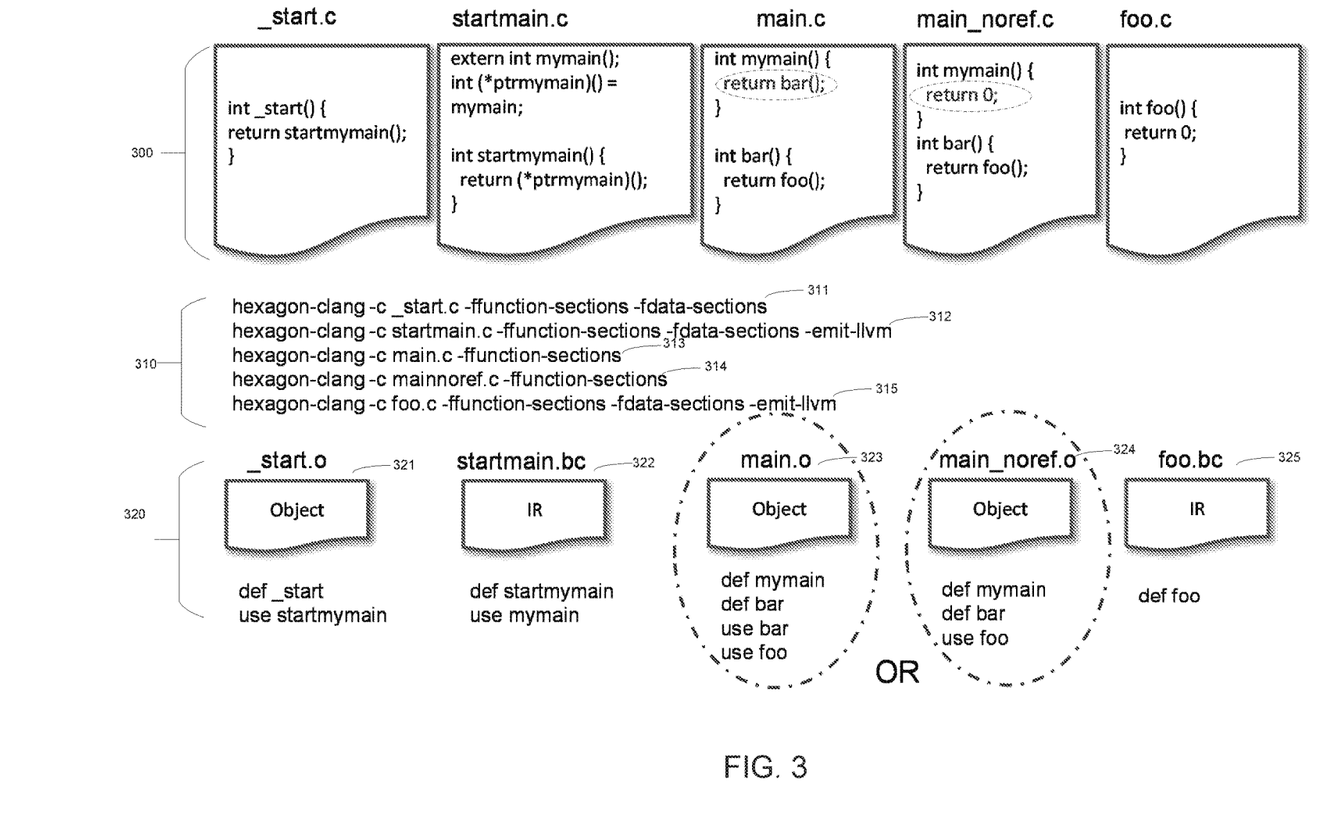
FIG. 3 shows source code and its partially compiled variations to illustrate how symbols may be evaluated by a linker in a step of an LTO process.

FIG. 3 illustrates an example of how source code, once compiled into object code and IR, can result in symbols being preserved unnecessarily. Shown at the top of the diagram are source code files 300, which include _start.c, startmain.c, main.c, main_noref.c, and foo.c. Below the source code files are compilation lines 310 for the source code files 300 above as a result of the first step of the compiler 125. As shown, some of the source code files 300 are compiled as object code, such as lines 311, 313, and 314. Other files, such as lines 312 and 315, are compiled as compiler-specific IR, as indicated by the designation -emit-llvm at the end of the lines. Shown below the compilation lines are representations 320 of the sections of files as they would be utilized by the linker during symbol def-use analysis. In general, an executable has particular areas, known as sections, where things like code and data are placed. Each object itself has these kinds of sections, and one of the functions of a linker is to place (i.e., relocate) similar kinds of sections together in the final executable.

When Linker (step 1) receives the object code and IR files 320, it can read the object code and tell what symbols are contained within it, and may determine from those files alone what symbols should be preserved (due to its contained definitions and uses) and included in the preserve list. However, it cannot read the two IR files, which are startmain.bc and foo.bc. The result of the linker being able to read object code files 321, 323, and 324, but not IR files 322 and 325, would ordinarily result in the symbol "foo" to be preserved on the preserve list, even though it may not actually need to be preserved. To illustrate the example, the two object files main.o and main_noref.o are circled. The present example of FIG. 3 compares the differences between main.c and main_noref.c; only one of them will be compiled and then executed in a given execution of the program, which means that either main.o or main_noref.o will exist in the final executable. The options main.c and main_noref.c are alternative entry points to the computer program. Only one may be used at a time, and the example shows the differences when one is used instead of the other.

During LTO, when the linker gathers different files, it joins several of them into a single scope, which is also known as the LTO scope or the IR scope. In FIG. 3, several files are shown that stay in object format (that are not in IR). These files are start.o 321, main.o 323, and main_noref.o 324. The other two files, startmain.bc 322 and foo.bc 325, are in IR and therefore joined together by the linker in the same IR scope. It is the job of the linker to inform the compiler which of the objects that are currently in the IR scope are actually used in the object scope. The linker accomplishes this with the preserve list. The linker essentially tells the compiler that even though the compiler cannot see it, there are some files in the IR scope that use particular symbols. Therefore, the compiler cannot get rid of them even if the symbols appear "dead" (i.e., not used) to the compiler.

FIG. 3 shows that in the IR scope, (which, again, comprises startmain.bc 322 and foo.bc 325), there are no uses of foo. There is only a definition but not a use of foo (in foo.bc 325). If there is no symbol "foo" in the preserve list, the compiler is safe to assume that it can remove the symbol. Therefore, the compiler can optimize out the symbol foo. However, solely based on the IR scope, it is still undetermined whether the linker should tell the compiler whether to keep foo or not. There are two possibilities, based on whether main.c is used or main_noref.c is used as the entry point of the program. In the case of main.c, FIG. 3 shows that there is a function bar in main.c that calls function foo. That constitutes a use of function foo by function bar. In prior approaches, this use by itself would be sufficient to preserve foo. Prior approaches using LTO would utilize this type of "conservative" preserve list. The fact that the list would eventually be proven too conservative in that it unnecessarily preserves foo would become evident only at link-time, much later. Continuing with the example of main.c, bar is used by mymain. The function mymain in this example is an entry point in the program. Compilers in general assume that an entry point of the program is used. Compilers typically create a def-use tree that preserves only things that are reachable from that root. Anything unreachable from that root is "dead" to the compiler and ultimately garbage collected by the linker. So in this case, bar is used by mymain, and foo is used by bar, so foo must be preserved.

The second possible entry point that could be used is main_noref.c, which conatins slightly different code than main.c. In the example of main_noref.c, there is still a formal use of foo (shown as int bar( ){ returnfoo( );}) However, bar itself is dead (shown as int mymain( ) { return 0;}). Bar itself can be garbage collected at the point in time when linking is started, because if the compiler attempts to construct a tree from mymain, and includes all the used functions, the def-use tree will not include bar. The linker can prove, in the object space, that there is no other use of bar anywhere. Additionally, because of aspects of the present disclosure, the linker can also see into IR space and tell whether there is a use of bar, and therefore whether there is a use of foo as well. In the present disclosure, the lack of the use of bar is identified even before the compiler is first called. Turning back briefly to FIG. 1, the identification and removal of both foo and bar can happen at Linker (step 1) 135. This step is known as the "first garbage collection" in the present disclosure. A "second garbage collection" takes place at Linker (step 2) 145, which is the normal garbage collection that takes place in prior approaches at link time. The "pre-screening," or first garbage collection, is what creates the optimized preserve list of the present disclosure. As previously discussed, in the prior art, such garbage collection does not take place until much later, at linker step 2. By moving the garbage collection earlier, to linker step 1, and by doing it twice, the optimal preserve list of the present disclosure can be generated. Essentially, the first garbage collection is for the purpose of pruning the conservative preserve list, and the second garbage collection eliminates the dead code.

Early garbage collection is implemented in the present disclosure in part by the way compilation lines are flagged in the compiler, which allows the linker to perform garbage collection functionality at Linker (step 1) 135. Specifically, as shown in compilation lines 310, -ffunction-sections/-fdata-sections compilation flags are specified for each line. As previously mentioned, a final executable typically has a single section for text, and the linker will place all functions in the section for functions. The inclusion of -ffunction-sections/fdata-sections (which is specified in the makefile) actually makes the compiler place each individual function into unique, individual sections. In other words, the flag -ffunction sections/-fdatasections breaks sections down to individual function size. So although the linker cannot delete functions out of a compiler, a linker can delete a section. As a result, Linker (step 1) 135 can perform garbage collection by deleting sections.

Figure 4:
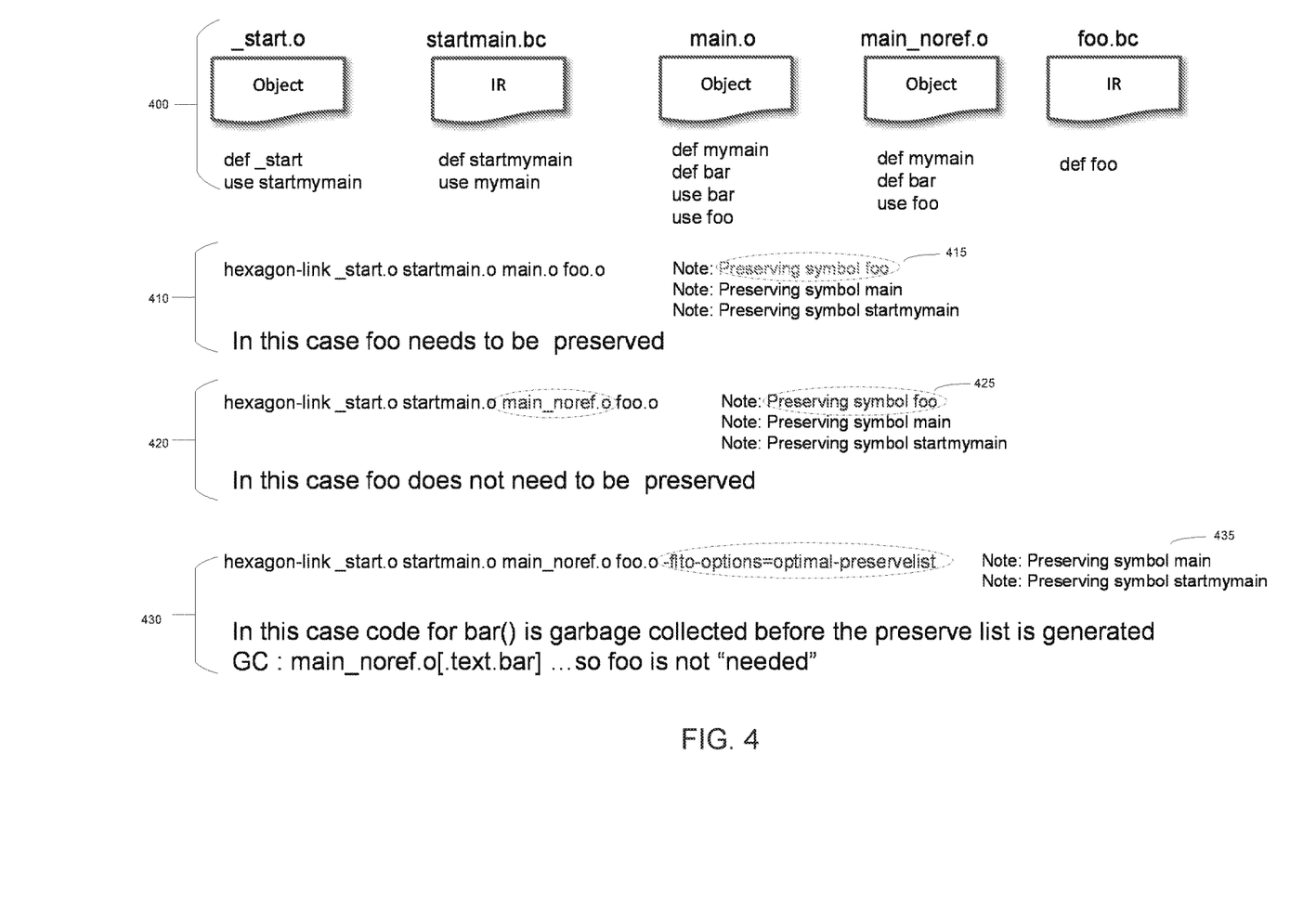
FIG. 4 shows how an embodiment of the present disclosure allows a linker to differentiate between symbols that should be preserved and symbols that do not need to be preserved on a preserve list.

FIG. 4 shows how an optimal preserve list may be generated based on the example of FIG. 3. At the top of the page, shown are representations 400 of object code and compiler specific IR code produced by Compiler (step 1). Just below is a link command line of code 410 provided by the user (e.g., from the makefile) in which main.o is used. As described with reference to FIG. 3, this example shows an instance in which main.o is the code used for the entry point of the program. As shown in FIG. 3, main.o calls bar, and bar calls foo. To the right of the link command line 410 is an example of a preserve list 415 in which three symbols are preserved, including foo, main, and startmymain. Foo is appropriately included because main.o is used in the linked executable image 410.

The next example of link command lines 420 shows an instance in which main_noref.o is the code used for the entry point of the program. As shown in FIG. 3, main_noref.o does not call (i.e., use) bar or foo. Note that at this point, the link command lines 410 and 420 both still include the actual function foo. However, because the linker knows that foo will actually not be needed in linked line 420, the list 425 which still preserves the symbol foo can be optimized to remove the symbol foo. As a result, the linker generates the following link command line (also known as a "linker invocation") 430, which generates the optimized preserve list 435, preserving only the symbols main and startmymain. In summary the link command lines 410 show one example in which the preserve list 415 is properly preserving foo, and link command lines 420 represent another example, with different code, in which foo does not need to be preserved on the preserve list 425. Then, because the code for bar is garbage collected before the preserve list is actually generated, foo can be left off of the optimized preserve list 435.

As an overview of the process of the present disclosure, Linker (step 1) 125 is able identify the correct symbols to keep related to IR code because Compiler (step 1) 115 acts as a parser of its own IR and communicates the symbol information to Linker (step 1) 125, and because it tracks its own local symbols and also passes those to Linker (step 1) 125. Another aspect of the disclosure is that due to the fact that an optimal preserve list is generated, the linker can perform two passes of garbage collection, as opposed to just one pass by either the linker or compiler toward the end of the process. The first garbage collection may take place at Linker (step 1) 125 before the preserve list 160 is generated. As shown in FIG. 4, link command line 420 contains no use of the function bar. The linker at step one 125 can recognize this because it sees that main_noref.o contains a definition of bar but no use of bar. Therefore, the linker can delete the code for bar. However, the function foo.o is still present in link command line 420, due to the fact that it was originally part of the source code written by the programmer But, because the optimized preserve list 435 does not include the symbol foo among its list of functions to preserve, later, at linker step 2 145, the linker can perform its normal round of garbage collection and delete the code for foo. As a result, the code is optimized by an early garbage collection of the function bar and a later collection of the function foo.

The example in FIG. 4 is a simple one that illustrates the concept of creating an optimal preserve list using only a small bit of source code with a few files. In actual implementations, many source code files and libraries may undergo a similar process to create an optimal preserve list for a global scope optimization. One of the benefits of LTO is that the optimization scope can be expanded to the global (e.g., whole application) scope level instead of just the local file level. In order to implement the optimal preserve list for a global scope, one aspect of the present disclosure is that Linker (step 1) 135 may perform additional "bookkeeping" of symbols. This may include keeping a list of all symbols tracked by the compiler at step one 115 for each file that it compiles into IR in the entire global scope. It may also include symbols that the linker can read out of compiled object files. Additionally, it may include symbols that the linker script 135 instructs the linker to keep at Linker (step 1) 135. This list may be known as a full symbol use tree. Any symbols on the full symbol use tree may then be deleted off of the preserve list 160 before it is passed to Compiler (step 2) 125.

Beneficially, the optimal preserve list is always smaller than (or equal) to the conservative one resulting in more optimization freedom for the compiler, which affects both size and cache-capacity related performance of the generated code. Large scale projects require a high degree of sophistication from tools to even achieve basic functionality, and a conservative preserve list does not provide this sophistication.

Figure 5:
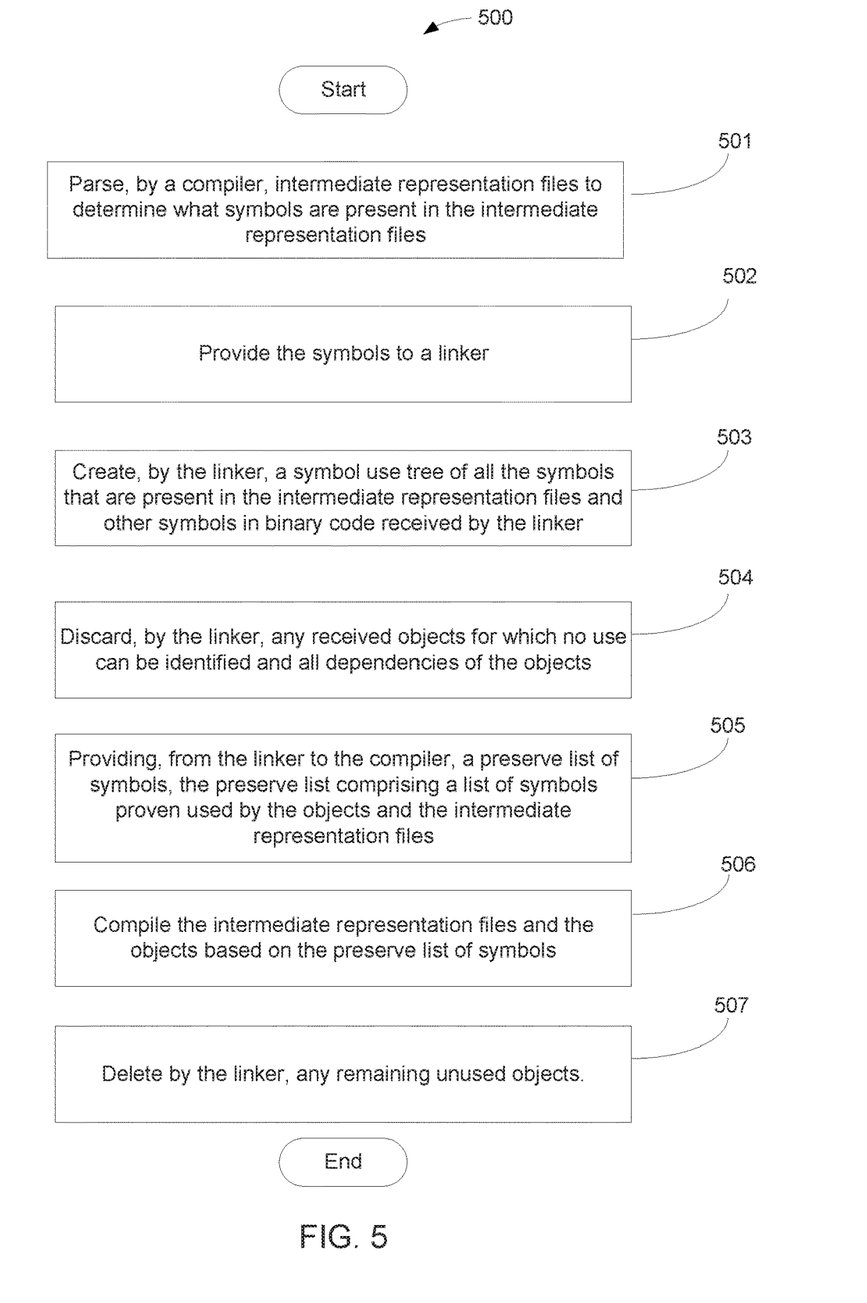
FIG. 5 is a flowchart of a method which may be traversed to perform an embodiment of the present disclosure.

FIG. 5 is a flowchart which may be traversed to implement a method 500 of link-time optimization. The method 500 may first include parsing, by a compiler, intermediate representation files to determine what symbols are present in the intermediate representation files at step 501. The method 500 may then comprise providing the symbols to a linker at step 502 and creating, by the linker, a symbol use tree of all the symbols that are present in the intermediate representation files and other symbols in binary code received by the linker at step 503. The method 500 further comprises discarding, by the linker, any received objects for which no use can be identified and all dependencies of the objects at step 504. Then, the method includes providing, from the linker to the compiler, at step 505 a preserve list of symbols, the preserve list comprising a list of symbols proven used by the objects and the intermediate representation files. The method also comprises compiling the intermediate representation files and the objects based on the preserve list of symbols at step 506, and deleting, by the linker, any remaining unused objects at step 507.

Figure 6:
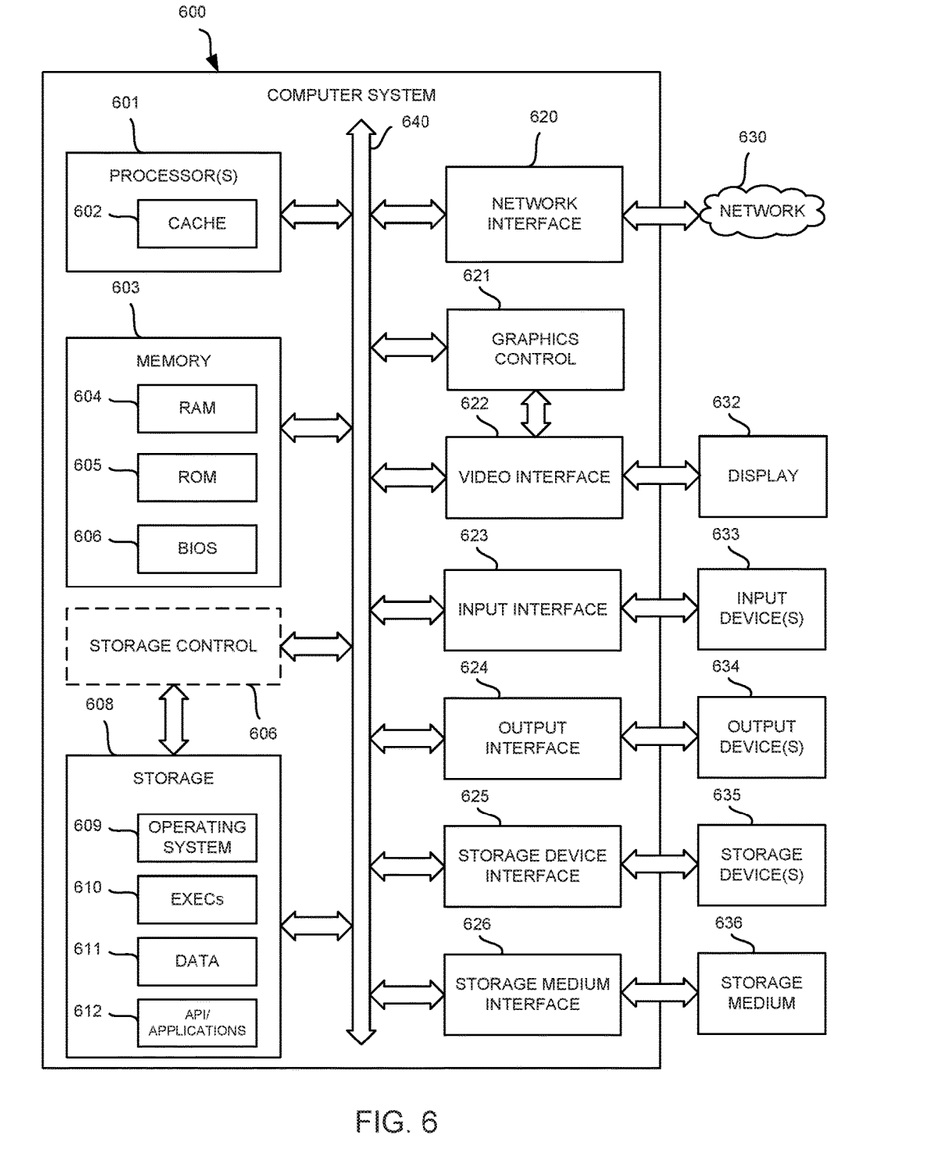
FIG. 6 is a hardware diagram of a computing device that may implement aspects of the present disclosure.

Referring next to FIG. 6, it is a block diagram depicting an exemplary machine that includes a computer system 600 within which a set of instructions can execute for causing a device to perform or execute any one or more of the aspects and/or methodologies for static code scheduling of the present disclosure. The components in FIG. 4 are examples only and do not limit the scope of use or functionality of any hardware, software, embedded logic component, or a combination of two or more such components implementing particular embodiments.

Computer system 600 may include a processor 601, a memory 603, and a storage 608 that communicate with each other, and with other components, via a bus 640. The bus 640 may also link a display 632, one or more input devices 633 (which may, for example, include a keypad, a keyboard, a mouse, a stylus, etc.), one or more output devices 634, one or more storage devices 635, and various tangible storage media 636. All of these elements may interface directly or via one or more interfaces or adaptors to the bus 640. For instance, the various tangible storage media 636 can interface with the bus 640 via storage medium interface 626. Computer system 600 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 601 (or central processing unit(s) (CPU(s))) optionally contains a cache memory unit 602 for temporary local storage of instructions, data, or computer addresses. Processor(s) 601 are configured to assist in execution of computer readable instructions. Computer system 600 may provide functionality for the components depicted in FIG. 1 as a result of the processor(s) 601 executing non-transitory, processor-executable instructions embodied in one or more tangible computer-readable storage media, such as memory 603, storage 608, storage devices 635, and/or storage medium 636. The computer-readable media may store software that implements particular embodiments, and processor(s) 601 may execute the software. Memory 603 may read the software from one or more other computer-readable media (such as mass storage device(s) 635, 636) or from one or more other sources through a suitable interface, such as network interface 620. The software may cause processor(s) 601 to carry out one or more processes or one or more steps of one or more processes described or illustrated herein. Carrying out such processes or steps may include defining data structures stored in memory 603 and modifying the data structures as directed by the software.

The memory 603 may include various components (e.g., machine readable media) including, but not limited to, a random access memory component (e.g., RAM 604) (e.g., a static RAM "SRAM", a dynamic RAM "DRAM, etc.), a read-only component (e.g., ROM 605), and any combinations thereof. ROM 605 may act to communicate data and instructions unidirectionally to processor(s) 601, and RAM 604 may act to communicate data and instructions bidirectionally with processor(s) 601. ROM 605 and RAM 604 may include any suitable tangible computer-readable media described below. In one example, a basic input/output system 606 (BIOS), including basic routines that help to transfer information between elements within computer system 600, such as during start-up, may be stored in the memory 603.

Fixed storage 608 is connected bidirectionally to processor(s) 601, optionally through storage control unit 607. Fixed storage 608 provides additional data storage capacity and may also include any suitable tangible computer-readable media described herein. Storage 608 may be used to store operating system 609, EXECs 610 (executables), data 611, API applications 612 (application programs), and the like. Often, although not always, storage 608 is a secondary storage medium (such as a hard disk) that is slower than primary storage (e.g., memory 603). Storage 608 can also include an optical disk drive, a solid-state memory device (e.g., flash-based systems), or a combination of any of the above. Information in storage 608 may, in appropriate cases, be incorporated as virtual memory in memory 603.

In one example, storage device(s) 635 may be removably interfaced with computer system 600 (e.g., via an external port connector (not shown)) via a storage device interface 625. Particularly, storage device(s) 635 and an associated machine-readable medium may provide nonvolatile and/or volatile storage of machine-readable instructions, data structures, program modules, and/or other data for the computer system 600. In one example, software may reside, completely or partially, within a machine-readable medium on storage device(s) 635. In another example, software may reside, completely or partially, within processor(s) 601.

Bus 640 connects a wide variety of subsystems. Herein, reference to a bus may encompass one or more digital signal lines serving a common function, where appropriate. Bus 640 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 600 may also include an input device 633. In one example, a user of computer system 600 may enter commands and/or other information into computer system 600 via input device(s) 633. Examples of an input device(s) 633 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 633 may be interfaced to bus 640 via any of a variety of input interfaces 623 (e.g., input interface 623) including, but not limited to, serial, parallel, game port, USB, FIREWIRE, THUNDERBOLT, or any combination of the above.

In particular embodiments, when computer system 600 is connected to network 630, computer system 600 may communicate with other devices, specifically mobile devices and enterprise systems, connected to network 630. Communications to and from computer system 600 may be sent through network interface 620. For example, network interface 620 may receive incoming communications (such as requests or responses from other devices) in the form of one or more packets (such as Internet Protocol (IP) packets) from network 630, and computer system 600 may store the incoming communications in memory 603 for processing. Computer system 600 may similarly store outgoing communications (such as requests or responses to other devices) in the form of one or more packets in memory 603 and communicated to network 630 from network interface 620. Processor(s) 601 may access these communication packets stored in memory 603 for processing.

Examples of the network interface 620 include, but are not limited to, a network interface card, a modem, and any combination thereof. Examples of a network 630 or network segment 630 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 630, may employ a wired and/or a wireless mode of communication. In general, any network topology may be used.

Information and data can be displayed through a display 632. Examples of a display 632 include, but are not limited to, a liquid crystal display (LCD), an organic liquid crystal display (OLED), a cathode ray tube (CRT), a plasma display, and any combinations thereof. The display 632 can interface to the processor(s) 601, memory 603, and fixed storage 608, as well as other devices, such as input device(s) 633, via the bus 640. The display 632 is linked to the bus 640 via a video interface 622, and transport of data between the display 632 and the bus 640 can be controlled via the graphics control 621.

In addition to a display 632, computer system 600 may include one or more other peripheral output devices 634 including, but not limited to, an audio speaker, a printer, and any combinations thereof. Such peripheral output devices may be connected to the bus 640 via an output interface 624. Examples of an output interface 624 include, but are not limited to, a serial port, a parallel connection, a USB port, a FIREWIRE port, a THUNDERBOLT port, and any combinations thereof.

In addition or as an alternative, computer system 600 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for link time optimization, the method comprising:
   receiving a customized linker script;
   parsing, by a compiler, intermediate representation files to determine what symbols are present in the intermediate representation files;

providing the symbols determined by the parsing to a linker;
creating, by the linker, a symbol use tree of all the symbols that are present in the intermediate representation files and other symbols in binary code received by the linker;
discarding, by the linker, any received objects for which no use can be identified and all dependencies of the objects;
providing, from the linker to the compiler, after the discarding, a preserve list of symbols, the preserve list comprising a list of:
 only symbols in both the intermediate representation files and the binary code that are proven used by the objects and the intermediate representation files, and
 any additional symbols specified by the customized linker script;
compiling the intermediate representation files and the objects based on the preserve list of symbols, and
deleting, by the linker, any remaining unused objects.

2. The method of claim 1, wherein the customized linker script controls the layout of an executable in an embedded development environment.

3. The method of claim 1, further comprising:
tracking, by the compiler, all symbols of a compilation scope.

4. The method of claim 1, further comprising:
instructing, by the customized linker script, that the linker add a definition and use of a symbol that does not exist in either a linker or compiler space to the preserve list.

5. The method of claim 1, wherein the symbol use tree created by the linker comprises symbols from a global scope of optimization.

6. The method of claim 1, wherein an instruction from the linker to the compiler to parse the intermediate representation file and the providing of the symbols determined by the parsing to the linker occurs through an application program interface between the linker and the compiler.

7. A computing device comprising a processor and a memory, the processor and memory implementing a linker and a compiler that are configured to perform a method for link-time optimization, the method comprising:
receiving a customized linker script;
parsing, by a compiler, intermediate representation files to determine what symbols are present in the intermediate representation files;
providing the symbols determined by the parsing to a linker;
creating, by the linker, a symbol use tree of all the symbols that are present in the intermediate representation files and other symbols in binary code received by the linker;
discarding, by the linker, any received objects for which no use can be identified and all dependencies of the objects;
providing, from the linker to the compiler, after the discarding, a preserve list of symbols, the preserve list comprising a list of:
 only symbols in both the intermediate representation files and the binary code that are proven used by the objects and the intermediate representation files, and
 any additional symbols specified by the customized linker script;
compiling the intermediate representation files and the objects based on the preserve list of symbols, and
deleting, by the linker, any remaining unused objects.

8. The computing device of claim 7, wherein the customized linker script controls the layout of an executable in an embedded development environment.

9. The computing device of claim 7, wherein the method further comprises:
tracking, by the compiler, all symbols of a compilation scope.

10. The computing device of claim 7, wherein the method further comprises:
instructing, by the customized linker script, that the linker add a definition and use of a symbol that does not exist in either a linker or compiler space to the preserve list.

11. The computing device of claim 7, wherein the symbol use tree created by the linker comprises symbols from a global scope of optimization.

12. The computing device of claim 7, wherein the providing of the symbols to the linker occurs through an application program interface between the linker and the compiler.

13. A non-transitory, tangible computer readable storage medium, encoded with processor readable instructions to perform a method for link-time optimization, the method comprising:
receiving a customized linker script;
parsing, by a compiler, intermediate representation files to determine what symbols are present in the intermediate representation files;
providing the symbols determined by the parsing to a linker;
creating, by the linker, a symbol use tree of all the symbols that are present in the intermediate representation files and other symbols in binary code received by the linker;
discarding, by the linker, any received objects for which no use can be identified and all dependencies of the objects;
providing, from the linker to the compiler, after the discarding, a preserve list of symbols, the preserve list comprising a list of:
 only symbols in both the intermediate representation files and the binary code that are proven used by the objects and the intermediate representation files, and
 any additional symbols specified by the customized linker script;
compiling the intermediate representation files and the objects based on the preserve list of symbols, and
deleting, by the linker, any remaining unused objects.

14. The non-transitory, tangible computer readable storage medium of claim 13, wherein the customized linker script controls the layout of an executable in an embedded development environment.

15. The non-transitory, tangible computer readable storage medium of claim 13, wherein the method includes:
tracking, by the compiler, all symbols of a compilation scope.

16. The non-transitory, tangible computer readable storage medium of claim 13, wherein the method includes:
instructing, by the customized linker script, that the linker add a definition and use of a symbol that does not exist in either a linker or compiler space to the preserve list.

17. The non-transitory, tangible computer readable storage medium of claim 13, wherein the symbol use tree created by the linker comprises symbols from a global scope of optimization.

18. The non-transitory, tangible computer readable storage medium of claim 13, wherein the providing of the symbols to the linker occurs through an application program interface between the linker and the compiler.

* * * * *